United States Patent
Vander Veen

(10) Patent No.: US 8,307,039 B2
(45) Date of Patent: Nov. 6, 2012

(54) METHOD FOR DISAMBIGUATING EMAIL RECIPIENT FIELDS IN AN ELECTRONIC DEVICE

(75) Inventor: Raymond Paul Vander Veen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 209 days.

(21) Appl. No.: 11/877,745

(22) Filed: Oct. 24, 2007

(65) Prior Publication Data

US 2009/0112994 A1    Apr. 30, 2009

(51) Int. Cl.
G06F 15/16    (2006.01)
G06F 3/00    (2006.01)

(52) U.S. Cl. ...................................... 709/206; 715/739

(58) Field of Classification Search ................. 709/206, 709/207, 203; 715/744, 745, 747, 748, 739
See application file for complete search history.

(56) References Cited

U.S. PATENT DOCUMENTS

| | | | | |
|---|---|---|---|---|
| 6,052,709 A * | 4/2000 | Paul | ............................. | 709/202 |
| 6,557,045 B1 * | 4/2003 | Tsukui et al. | ................. | 709/245 |
| 6,829,607 B1 * | 12/2004 | Tafoya et al. | ..................... | 707/6 |
| 6,895,427 B2 * | 5/2005 | Quine et al. | ................. | 709/206 |
| 6,952,805 B1 * | 10/2005 | Tafoya et al. | ................. | 709/206 |
| 7,219,129 B2 * | 5/2007 | Weissman | ..................... | 709/206 |
| 7,512,654 B2 * | 3/2009 | Tafoya et al. | ................. | 709/204 |
| 7,543,026 B2 * | 6/2009 | Quine et al. | ................. | 709/206 |
| 7,689,921 B2 * | 3/2010 | Rajarajan et al. | ............. | 715/744 |
| 7,836,134 B2 * | 11/2010 | Pantalone | ..................... | 709/206 |
| 2006/0253536 A1 * | 11/2006 | Fujiwara et al. | ............. | 709/206 |

FOREIGN PATENT DOCUMENTS

| | | |
|---|---|---|
| EP | 1367522 A | 12/2003 |
| EP | 1469374 A | 10/2004 |
| WO | 2005053279 A | 6/2005 |
| WO | 2007143232 A | 12/2007 |

OTHER PUBLICATIONS

Petros Maniatis , Mema Roussopoulos , Ed Swierk , Kevin Lai , Guido Appenzeller , Xinhua Zhao , Mary Baker, "The mobile people architecture", ACM SIGMOBILE Mobile Computing and Communications Review, v.3 n. 3, p. 36-42, Jul. 1999 [retrieved from ACM database Aug. 28, 2009].*

Richard Frey, Examination Report, May 20, 2008.

* cited by examiner

Primary Examiner — Saleh Najjar
Assistant Examiner — Lashanya Nash
(74) Attorney, Agent, or Firm — Perry + Currier

(57) ABSTRACT

An electronic device and a method implemented within the electronic device for disambiguating email recipient fields by extracting sufficient information from the domain portion of an intended recipient's email address to disambiguate between a personal and a business email address. An exemplary method includes parsing at least one of said multiple addresses in a recipient field of the email to extract information capable of distinguishing the at least one of said multiple addresses from at least another of the multiple addresses, and displaying the information in the recipient field of the email.

6 Claims, 4 Drawing Sheets

Fig.3A  Address Book Entry:
Mike Johnson
ACME Labs
President & CEO
Email:mjohnson@acmelabs.com
Email:mike.johnson@gmail.com
Work: 1 800 GET ACME
Home: 1 213 334 8848

Fig.3B  Which email:
To: mike johnson|
Cc:
Subject

[?] Which address?
mikejohnson@gmail.com
mjohnson@acmelabs.c

Fig.3C  Compose corp and personal:
To: Mike Johnson
To: Mike Johnson
Subject: Personal <Message body>|

Fig.3D  Unambiguous recipient fields:
To: Mike Johnson (gmail)
To: Mike Johnson (acmelabs)
To:
Subject:Birthday bash <Message body>|

METHOD FOR DISAMBIGUATING EMAIL RECIPIENT FIELDS IN AN ELECTRONIC DEVICE

FIELD

The present disclosure relates to electronic devices, and in particular to a method for disambiguating email recipient fields in an electronic device.

BACKGROUND

Address book applications may be used for storing names, addresses, telephone and mobile phone numbers, fax numbers, email addresses, etc. Also, multiple addresses may be provided for each address book entry, such as one or more home phone and email addresses and one or more business phone and email addresses. In addition, address book applications may prompt a user to select one from a multitude of phone and email addresses when placing a call or composing an email message.

In the context of email, there are some circumstances in which a user may require a clear indication of which of a multitude of email addresses has been selected while composing an email. For example, if an email contains potentially sensitive company information it may be important for the user to be confident that the intended recipient's business email address has been selected, rather than a home or personal email address. Conversely, if the email contains potentially sensitive personal information it may be important for the user to be confident that the intended recipient's home or personal email address has been selected, rather than the recipient's business email address.

Thus, in general, a problem exists in providing an indication to a user of which of a multitude of email addresses has been selected while composing an email.

BRIEF DESCRIPTION OF THE DRAWINGS

The embodiments will be better understood with reference to the following Figures in which like numerals denote like parts and in which:

FIGS. 3A-3D are screen shot representations of a graphical user interface associated with disambiguating email recipient fields according to an exemplary embodiment.

DETAILED DESCRIPTION

In one aspect, discussed in greater detail below with reference to FIGS. 1-4, a method is set forth of disambiguating multiple addresses of an intended email recipient, comprising parsing at least one of the multiple addresses in a recipient field of the email to extract information capable of distinguishing the at least one of the multiple addresses from at least another of the multiple addresses, and displaying the information in the recipient field of the email.

In another aspect there is set forth a portable electronic device including a memory having recorded thereon statements and instructions for execution by a processor to carry out the foregoing method.

Figure 1:
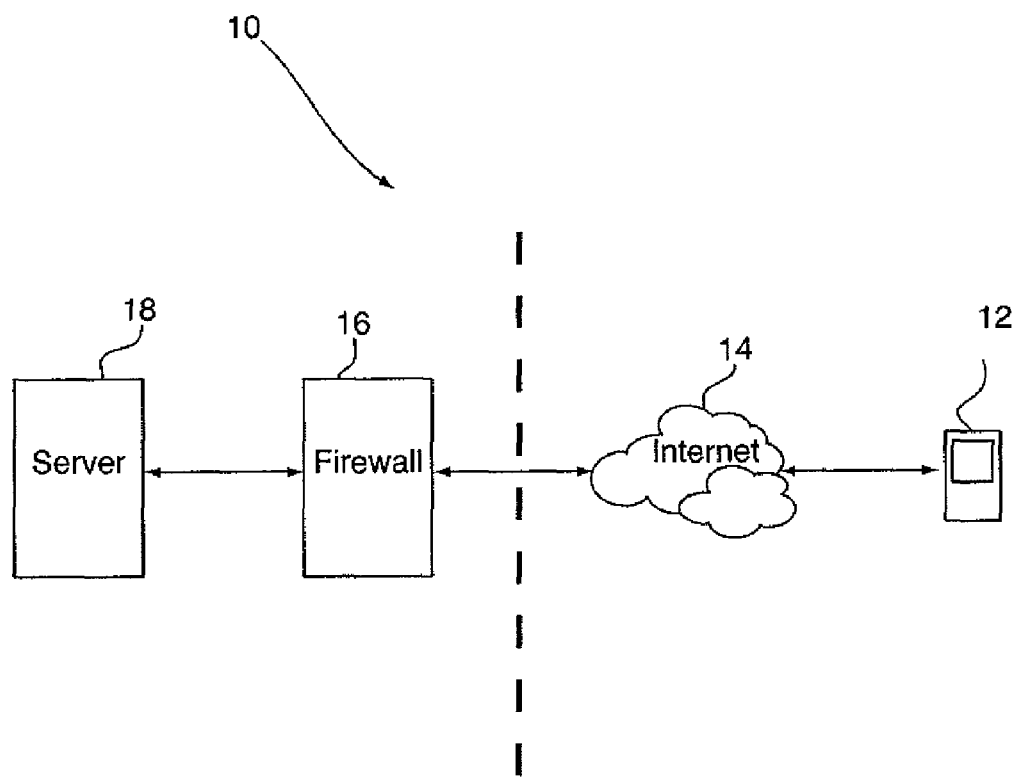
FIG. 1 is a schematic diagram of a wireless communication system.

FIG. 1 shows an exemplary communication system 10 for a portable electronic device 12. The portable electronic device 12 is operable to effect communications over a radio communications channel and communicates with a base station (not shown) while located within a coverage area that is defined by the base station. The base station is part of a wireless network that is in communication with the Internet 14. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A server 18 handles wireless client requests from the portable electronic device 12. A firewall, or proxy server, 16, is provided between the server 18 and the Internet 14. The server 18 further operates as a Mail Server, which communicates with an email client of the portable electronic device 12 to allow a user to send and receive email messages.

Figure 2:
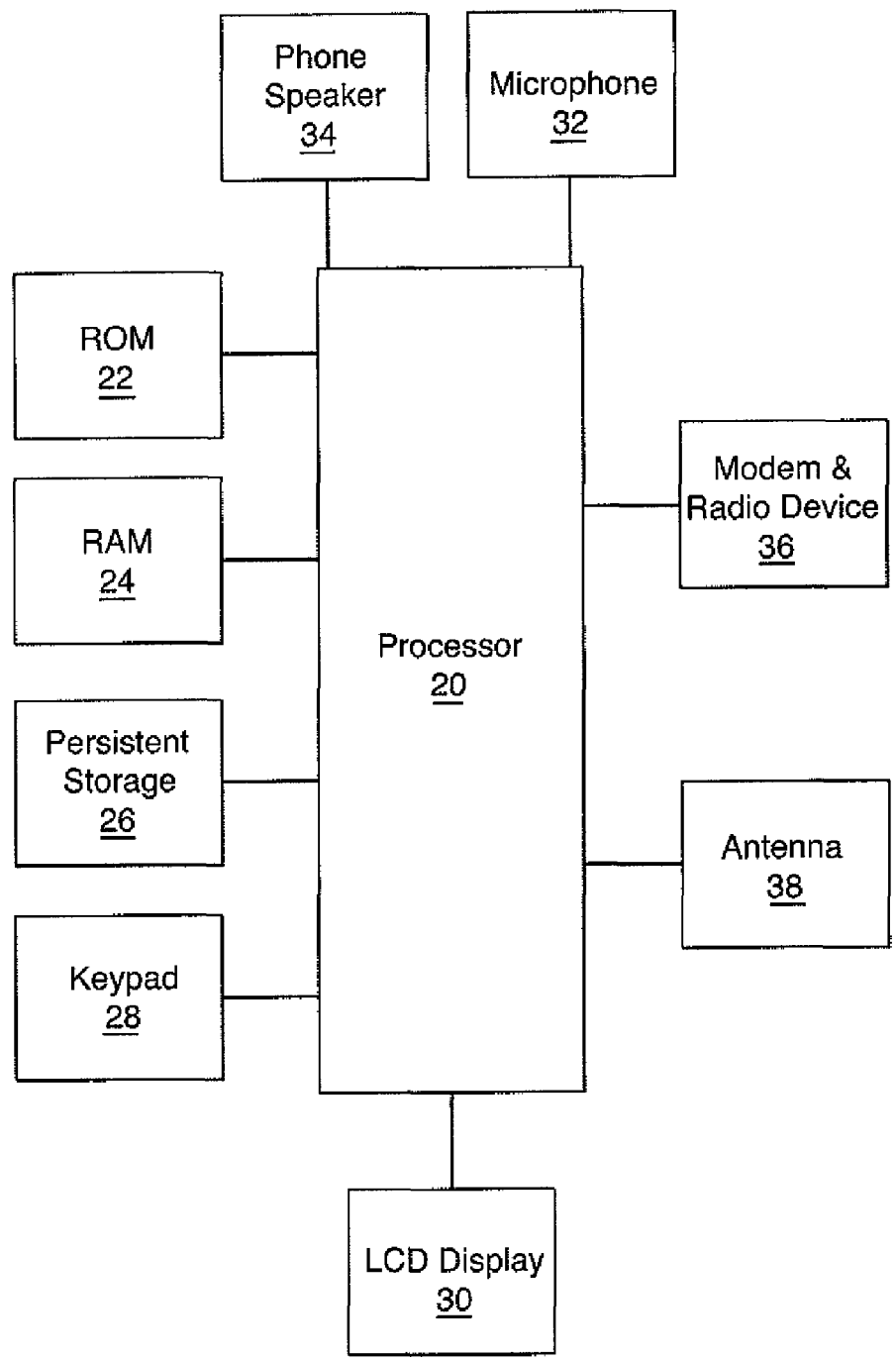
FIG. 2 is a block diagram of components of a portable electronic device.

FIG. 2 is a block diagram showing certain components within an exemplary embodiment of the portable electronic device 12. In this embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

The portable electronic device 12 includes a processor 20 connected to a read-only-memory (ROM) 22 that contains a plurality of applications executable by the processor 20 for enabling each portable electronic device 12 to perform certain functions including, for example, PIN message functions, SMS message functions, address book and calendaring functions, and cellular telephone functions. The processor 20 is also connected to a random access memory unit (RAM) 24 and a persistent storage device 26 to facilitate various non-volatile storage functions of the portable electronic device 12. The processor 20 receives input from one or more input devices, including a keypad 28. The processor 20 outputs to one or more output devices, including an LCD display 30. A microphone 32 and phone speaker 34 are connected to the processor 20 for cellular telephone functions. The processor 20 is also connected to a modem and radio device 36. The modem and radio device 36 is used to connect to wireless networks and transmit and receive voice and data communications through an antenna 38.

As discussed above, it is common for electronic device 12 to implement an address book application for storing names, addresses, telephone and mobile phone numbers, fax numbers, email addresses, etc. As shown in FIG. 3A, multiple addresses and phone numbers may be stored for each address book entry, such as a home phone (1-213-334-8848), home email address (mikejohnson@gmail.com), a business phone (1-800-GET-ACME) and business email address (mjohnson@acmelabs.com). It is also common for such address book applications to prompt a user to select one from a multitude of phone and email addresses to place a call or compose an email message, as shown in FIG. 3B. It will be noted that the address book application conventional displays a 'short form' of the intended recipient's name. Thus, in FIG. 3B when mjohnson@acmelabs.com is selected, the address book application simply displays "Mike Johnson" in the "To:" field of the email message being composed. Accordingly, there is no way of distinguishing between the intended recipient's personal and business email addresses.

In the context of email, there are some circumstances in which a user may require a clear visual indication of which of a multitude of email addresses has been selected while composing an email. For example, if an email contains potentially sensitive company information it may be important for the user to be confident that the intended recipient's business email address has been selected, rather than a home or personal email address. Conversely, if the email contains potentially sensitive personal information it may be important for the user to be confident that the intended recipient's home or personal email address has been selected, rather than the recipient's business email address. Alternatively, if the user is uncertain as to whether the intended recipient (Mike Johnson) is at home or at the office on a given day at a given time, the user may specify both the personal and business email address, as shown in FIG. 3C.

If, for some reason, the user decides that the content of the email message being composed is not appropriate for the intended recipient's business email address the user may wish to delete the intended recipient's business email address from the "To:" field of the email message. However, there is no way to discern between the personal and business email addresses in the conventional display of FIG. 3C.

One possible solution is to include the intended recipient's full email address after the short form name (e.g. To: Mike Johnson (mjohnson@acmelabs.com) and To: Mike Johnson (mike.johnson@gmail.com). However, display of the intended recipient's full email address after the short form name is typically not feasible on a portable electronic 12 having only limited screen real estate.

Therefore, in accordance with an aspect of an embodiment of a method for disambiguating email recipient fields in an electronic device sufficient information is extracted from the domain portion of an intended recipient's email address to disambiguate between a personal and a business email address. Thus, as shown in FIG. 3D, the first (i.e. left-most) label of the domain is displayed after the name of the intended recipient, thereby clearly distinguishing between the personal email address (gmail) and the business email address (acmelabs).

Figure 4:
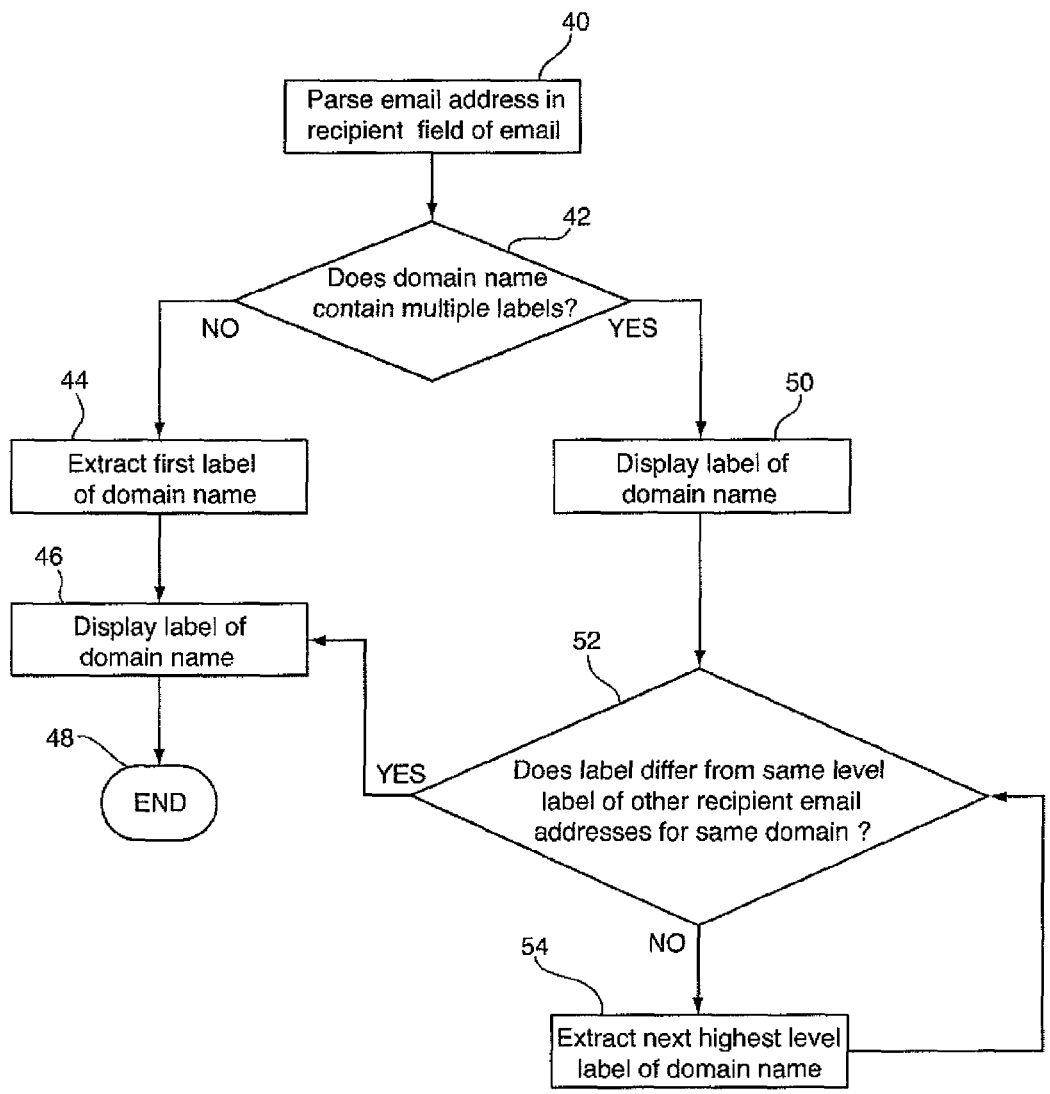
FIG. 4 is a flowchart showing a method for disambiguating email recipient fields according to an exemplary embodiment.

Referring to FIG. 4, a flowchart is provided showing a method for disambiguating email recipient fields according to an exemplary embodiment. At step 40, the email address in the recipient field (e.g. mike.johnson@gmail.com) is parsed. The "second-level" domain directly to the left of the top level domain (i.e. gmail) is extracted (step 44) and then displayed (step 46). In one embodiment, the second-level domain (or "lowest level label" using the terminology of RFC 1034) is displayed adjacent the 'friendly' name (Mike Johnson) of the intended recipient, as shown in FIG. 3D.

Although in many cases, the first label of the domain name will be sufficient to disambiguate the intended recipient's email address, where the domain name contains multiple labels (step 42), the exemplary method of FIG. 4 extracts the first label of the domain name (step 50). If the first label (e.g. "city" in the domain name "city.waterloo.on.ca") is sufficient (i.e. a "YES" at step 52) to distinguish from the same level label (e.g. first) of any other recipient email addresses for the same domain (e.g. "suburbs" in "suburbs.waterloo.on.ca") then the first label is displayed (step 46). In one embodiment, the label is displayed adjacent the 'friendly' name of the intended recipient (e.g. "To: Mike Johnson (city)").

If the first label is not sufficient to disambiguate the intended recipient's email address, (i.e. a "NO" at step 52), then at step 54 the next highest level label is extracted (e.g. "waterloo" in "city.waterloo.on.ca") and step 52 is repeated. Thus, if Mike Johnson's email address is mjohnson@city.works.waterloo.on.ca, and other users are allocated addresses that are distinguished via the second label (i.e. "works") then repetition of method steps 52 and 54 will distinguish "city.works.waterloo.on.ca" from "city.parks.waterloo.on.ca", as but one example.

A person of ordinary skill in the art will understand that the exemplary method set forth in FIG. 4 may be repeated an additional one or more times to display distinguishing labels for additional recipients identified in additional "To:", "c.c.:" or "b.c.c." fields of the email being composed, or to display distinguishing labels for alternate email addresses for the intended recipient identified in additional "To:", "c.c.:" or "b.c.c." fields of the email being composed, as shown in FIG. 3D.

A specific embodiment has been shown and described herein. However, modifications and variations may occur to those skilled in the art. For example, although the exemplary embodiment has been described in terms of an address book application on a portable handheld electronic device, the principles set forth herein may be applied to address book implementations on other devices such as desktop computers, etc. All such modifications and variations are believed to be within the sphere and scope of the present embodiment.

What is claimed is:

1. A method implemented in a portable electronic device of disambiguating multiple addresses of an intended email recipient, comprising:

parsing at least one of said multiple addresses in a recipient field of said email using a processor of said portable electronic device to extract information capable of distinguishing said at least one of said multiple addresses from at least another of said multiple addresses, wherein said parsing further includes:

determining that the domain name of said at least one of said multiple addresses contains multiple labels;

extracting, based on the determining, information from the domain name of said at least one of said multiple addresses, and wherein said information comprises said first label of said domain name and omits a second label of the domain name of said at least one of said multiple addresses;

determining that extracted information, based on the extracting, is sufficient to disambiguate the intended email recipient's at least one email address from said multiple addresses; and, when the first label is not sufficient to disambiguate the intended recipient's at least one email address from said multiple addresses, then iteratively extracting a next highest level label information from said domain name and omitting at least a local part of said at least one of said multiple addresses;

displaying, based on the determining, said extracted information adjacent a name of said intended recipient on a display of said portable electronic device in the recipient field of said email, wherein said name is associated with said at least one of said multiple addresses and independent of said at least one of said multiple addresses.

2. A method as claimed in claim 1, further comprising prompting selection of said at least one of said multiple addresses prior to said parsing and responsive to entry of said name for said intended recipient in the recipient field of said email.

3. A portable electronic device comprising a memory having recorded thereon statements and instructions for execution by said processor to carry out the method of claim 2.

4. A portable electronic device comprising a memory having recorded thereon statements and instructions for execution by said processor to carry out the method of claim 1.

5. A method implemented in a portable electronic device of disambiguating multiple addresses of an intended email recipient, comprising:
  parsing at least one of said multiple addresses in a recipient field of said email using a processor of said portable electronic device to extract information capable of distinguishing said at least one of said multiple addresses from at least another of said multiple addresses, wherein said parsing further includes:
  determining that the domain name of said at least one of said multiple addresses contains multiple labels;
  extracting, based on the determining, information from the domain name of said at least one of said multiple addresses, wherein said information comprises said first label of said domain name of said at least one of said multiple addresses and omits a second label of the domain name of said at least one of said multiple addresses and said at least a portion of said domain name of said at least one of said multiple addresses differs from at least portion of the domain name of said at least another one of said multiple addresses;
  determining that extracted information, based on the extracting, is sufficient to disambiguate the intended email recipient's at least one email address from said multiple addresses; and,
  when the first label is not sufficient to disambiguate the intended recipient's at least one email address from said multiple addresses, then iteratively extracting a next highest level label information from said domain name and omitting at least a local part of said at least one of said multiple addresses; and
  displaying, based on the determining, only said extracted information adjacent a name of said intended recipient on a display of said portable electronic device in the recipient field of said email, wherein said name is associated with said at least one of said multiple addresses and independent of said at least one of said multiple addresses.

6. A portable electronic device comprising a memory having recorded thereon statements and instructions for execution by said processor to carry out the method of claim 5.

* * * * *